UNITED STATES PATENT OFFICE.

HUGH RODMAN, OF PHILADELPHIA, PENNSYLVANIA.

ELECTROLYTIC DIAPHRAGM AND PROCESS OF MAKING SAME.

SPECIFICATION forming part of Letters Patent No. 720,741, dated February 17, 1903.

Application filed March 13, 1902. Serial No. 98,830. (No specimens.)

*To all whom it may concern:*

Be it known that I, HUGH RODMAN, a citizen of the United States, residing in Philadelphia, in the county of Philadelphia, State of Pennsylvania, have invented certain new and useful Improvements in Porous Electrolytic Diaphragms and in Processes of Making Such Electrolytic Diaphragms, of which the following is a full and accurate description.

My invention relates to electrolytic diaphragms of porous inert materials; and it consists, broadly, of a diaphragm of porous inert gum or rubber and of a method of producing such a diaphragm. To this end I mix an inert gum—such as rubber, gutta-percha, &c.—or a gummy mixture, such as crude rubber and sulfur, with a soluble substance, such as an alkali sulfate, fashion and harden this mixture as desired, and finally dissolve out the soluble substance.

I do not wish to limit this invention to any one ratio of dissolved to permanent material, as this ratio can be usefully varied to produce diaphragms of different degrees of hardness and porosity, nor to limit it to any one form of diaphragm, as the form will necessarily vary with different uses; but I will describe one ratio and one form that have given satisfactory results.

I very thoroughly mix between mixing-rollers three parts of Para rubber, two parts of sulfur, and fifteen parts of finely-powdered potassium sulfate and then roll this smooth mixture out to an even sheet one-sixteenth of an inch thick. This can now be molded into any form desired, either alone or as a central web of a two-chambered jar having sides and bottom of rubber, not to become porous. For experimental purposes I prefer to mold it over a cylindrical mandrel, so making a round jar about six inches high and two inches wide. The next step is the hardening or vulcanizing, which I do at a temperature of 300° Fahrenheit for about ten hours, taking particular care to have this heat dry. The process is finished by soaking the hardened jar for four or five days in running water, which will take out all traces of potassium sulfate. The material so made is strong, light, and has the appearance and smooth surface of ordinary hard non-porous rubber. It, however, offers very little resistance to electrolytic action through its pores, while at the same time it practically stops any diffusion other than that due to electrolysis. With these qualities, as well as that of easy manufacture, it makes a good material for the porous cups of primary batteries or for any electrolytic aqueous process requiring an inert highly-porous durable diaphragm. It is, for instance, eminently suitable for the decomposition of brine.

I am aware that it has been proposed to make a diaphragm of hard rubber by the process of agglomerating rubber-dust or rubber-shavings; but the product of this method is far inferior to mine in ease of manufacture and mechanical strength and fineness of porosity.

Having described my invention, what I claim as new, and desire to secure by Letters Patent, is—

1. A porous, electrolytic diaphragm of hardened, inert gum or rubber from which some soluble substance has been dissolved.

2. The process of making porous, electrolytic diaphragms, consisting of mixing an inert gum with a soluble substance, of molding and hardening the mixture, and of subsequently dissolving out the soluble substance.

3. The process of making porous, electrolytic diaphragms, consisting of mixing together crude rubber, sulfur and potassium sulfate, of molding and vulcanizing the mixture and of subsequently dissolving out the potassium sulfate.

In testimony whereof I have signed my name to this specification in the presence of two subscribing witnesses.

HUGH RODMAN.

Witnesses:
 EDWARD WAUTON SMITH,
 BRUCE FORD.